July 15, 1969          G. D. JENNEY          3,455,318
HYDRAERIC POSITION MONITORING APPARATUS WITH FEEDBACK
Filed May 24, 1965          2 Sheets-Sheet 2
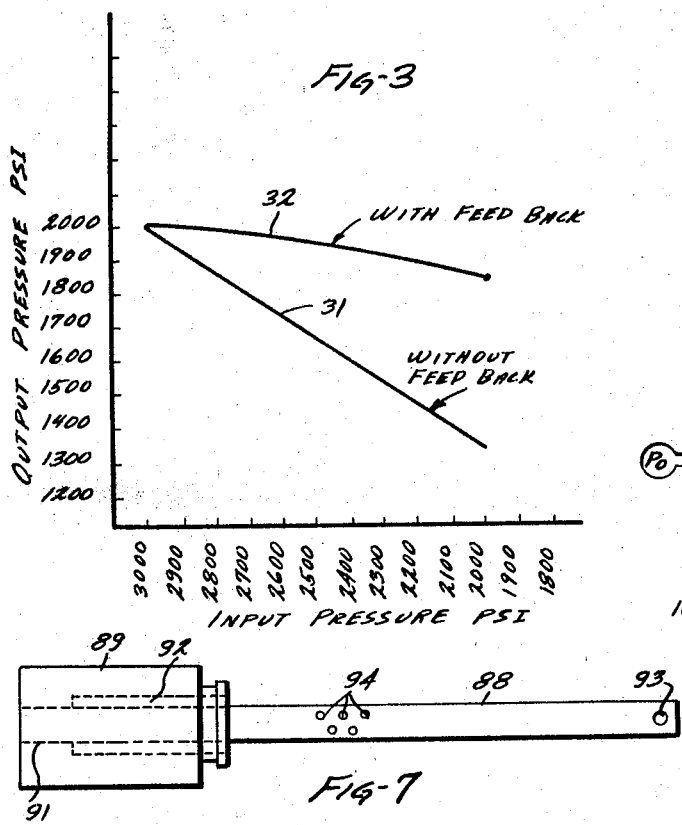
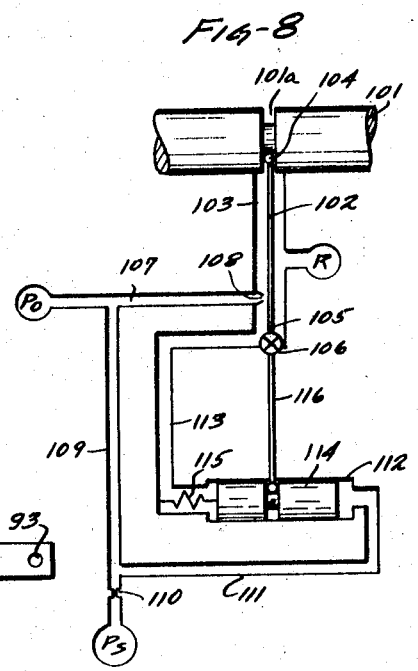
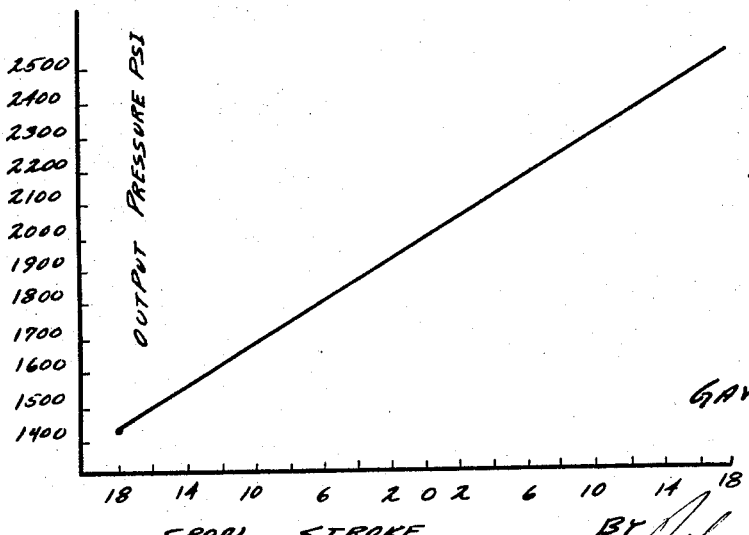
INVENTOR
GAVIN D. JENNY
BY Nilsson, Robbins, Anderson
ATTORNEYS

United States Patent Office 3,455,318
Patented July 15, 1969

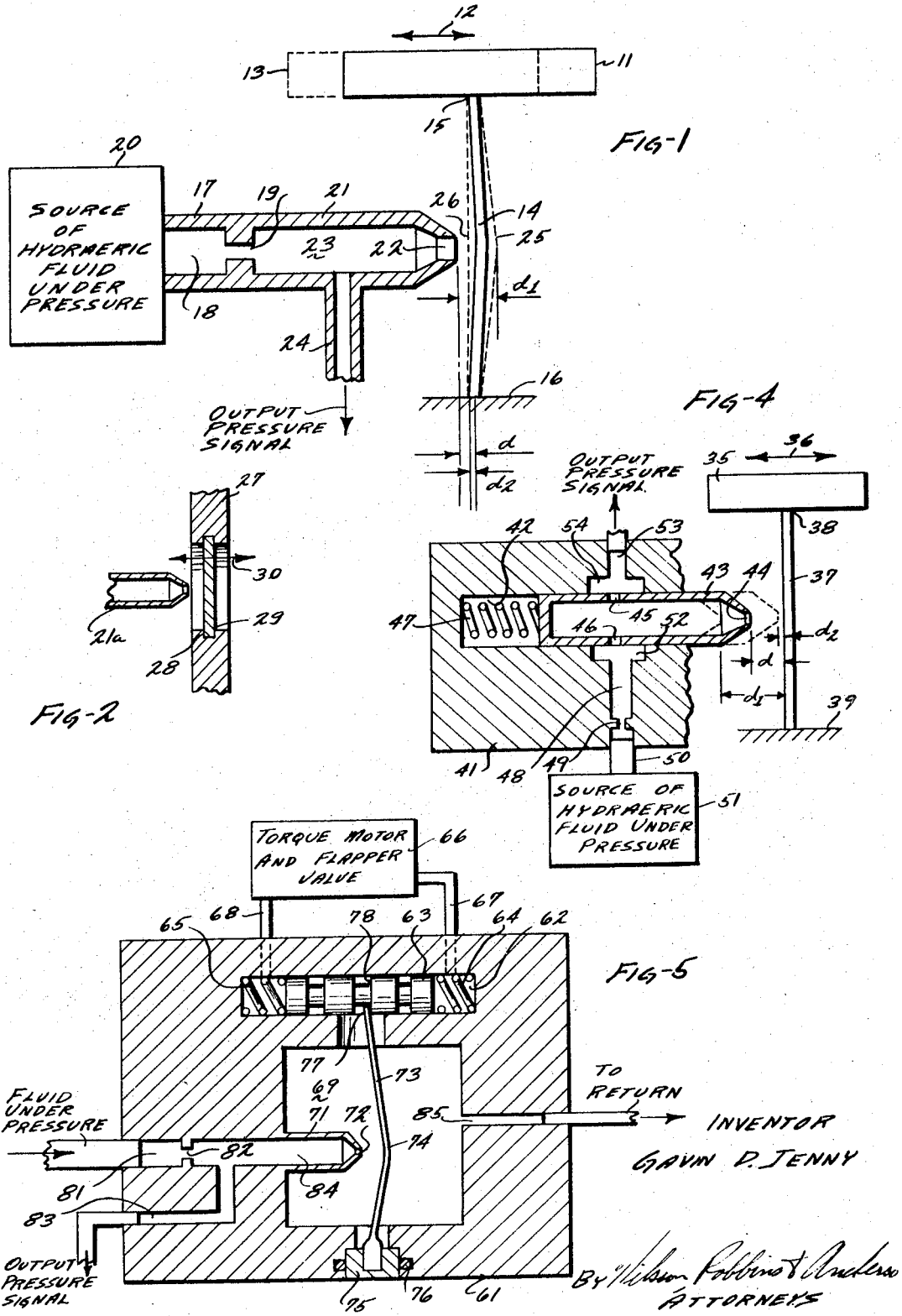

3,455,318
HYDRAERIC POSITION MONITORING APPARATUS WITH FEEDBACK
Gavin D. Jenney, Sepulveda, Calif., assignor to Bell Aerospace Corporation, a corporation of Delaware
Filed May 24, 1965, Ser. No. 458,225
Int. Cl. F15b 5/00; G05d 15/06
U.S. Cl. 137—85                                                12 Claims

ABSTRACT OF THE DISCLOSURE

Disclosed is a position monitoring apparatus having negative pressure feedback which includes a bendable beam fixed at one end and attached to the device whose position is to be monitored at the other. The beam is positioned adjacent a nozzle orifice, through which fluid under pressure is directed after passing through a restriction. The fluid impinges against the beam. The distance between the beam and the nozzle orifice is variable as a result of changes in pressure in the nozzle irrespective of how they may be created, i.e. by source pressure variation or by change in position of the monitored device. The distance change caused by pressure variation may result preferably because the beam is sufficiently flexible at the area of fluid impact to flex responsive to fluid pressure change. Alternatively, such may be caused by providing a nozzle which moves responsive to the pressure changes; or by connecting the beam to a piston movable responsive to pressure changes. A conduit is connected between the nozzle orifice and the restriction to provide an output pressure signal which is proportional to the position of the monitored device. The device being monitored may be a spool valve whose position is controlled by a torque motor and flapper valve apparatus as is well known.

---

This invention relates to position monitoring apparatus and more particularly to apparatus for producing a hydraeratic signal proportional to the position of a movable member which apparatus incorporates as an integral part thereof, pressure feedback. The term hydraeric and its derivatives as used throughout this specification and the claims is defined as being generic to hydraulic and pneumatic, and as synonymous in the broad sense with fluid under pressure.

It has long been desirable to monitor the position of a given movable member for various reasons. In most instances in the prior art such monitoring has been accomplished by mechanical apparatus or where signals must be transmitted for appreciable distance by electrical or electro-mechanical apparatus, which apparatus presented a number of disadvantages and operating difficulties. These disadvantages and operating difficulties have been overcome by a hydraeric position monitoring apparatus of the type disclosed in co-pending patent application Ser. No. 458,224, filed May 24, 1965, and assigned to the assignee of this application. As is disclosed in the above-referred to patent application, the position monitoring apparatus includes nozzle means which is adapted for connection to a source of hydraeric fluid under pressure, and having an orifice through which the fluid is expelled. Positioned a predetermined distance away from the nozzle orifice is a baffle member against which the expelled fluid is directed. The predetermined distance between the nozzle orifice and the baffle member in combination with the diameter of the nozzle orifice establishes at a given input pressure a predetermined reference pressure in the nozzle. Means is interconnected between a movable member, the position of which is to be monitored, and the nozzle means or the baffle member to cause movement thereof as the movable member changes its position. Thus the predetermined distance between the nozzle orifice and the baffle member is varied. As this predetermined distance changes the pressure in the nozzle changes proportionally, thus providing a hydraeric signal uniquely indicative at all times of the position of the movable member.

With such hydraeric position monitoring apparatus, it has been discovered that if the pressure at the source of hydraeric pressure connected to the apparatus tends to vary for any reason, an error signal can be produced at the output of the position monitoring apparatus even though the member whose position is to be monitored has remained stationary. That is, changes in input pressure can, under certain circumstances, be fed through the position monitoring apparatus and caused to appear at the output as a position change of the member being monitored. Such sensitivity to input pressure changes is of course, undesirable in many applications. It has also been dicovered that with such apparatus as the type above described, the output pressure signal developed as a result of a change in the predetermined spacing or distance between the nozzle orifice and the baffle plate is not always linear. Under certain circumstances, linearity between movement of the device whose position is being monitored and the output pressure signal is very desirable. That is, for each increment of movement of the device whose position is being monitored, it is desirable to obtain a given increment of change in the output pressure signal.

It has further been determined that under certain operating circumstances it is desirable to have a system which is extremely sensitive and which will respond to extremely low amplitude changes in position and in pressure. Thus, it becomes necessary to adapt the position monitoring apparatus so that it is not required to overcome friction or sticking which sometimes occurs in hydraeric systems.

Accordingly, it is an object of the present invention to provide a hydraeric position monitoring apparatus having pressure feedback which is substantially insensitive to pressure variations which may occur in the source of hydraeric pressure connected thereto.

It is another object of the present invention to provide a hydraeric position monitoring apparatus having pressure feedback which provides substantially linear characteristics between movement of the apparatus whose position is being monitored, and an output pressure signal indicative of the position thereof.

It is another object of the present invention to provide a hydraeric position monitoring apparatus having pressure feedback which is extremely sensitive to low amplitude pressure variations and which has overcome friction and sticking usually present in prior art apparatus.

Additional objects and advantages of the present invention both as to its organization and method of operation will become apparent from a consideration of the following description taken in conjunction with the accompanying drawings which are presented by way of example only, and are not intended as a limitation upon the scope of the present invention as defined in the appended claims, and in which:

FIG. 1 is a schematic representation of one form of hydraeric position monitoring apparatus having feedback in accordance with the present invention;

FIG. 2 is a fragmentary view of an alternative arrangement of a portion of the structure shown in FIG. 1;

FIG. 3 is a graph illustrating a feature of the apparatus constructed in accordance with the present invention;

FIG. 4 is a schematic representation of an alternate embodiment of hydraeric position monitoring apparatus having pressure feedback in accordance with the present invention;

FIG. 5 is a schematic representation of a preferred form of a hydraeric position apparatus having feedback in accordance with the present invention;

FIG. 6 is a graph illustrating a feature of the apparatus constructed in accordance with the present invention;

FIG. 7 is a representation of one portion of the position monitoring apparatus in accordance with the present invention illustrating a particular feature thereof; and FIG. 8 is a schematic representation of an alternative embodiment of an apparatus constructed in accordance with the present invention.

A hydraeric position monitoring apparatus having pressure feedback in accordance with the present invention includes an orifice interconnected with a source of hydraeric fluid under pressure. Positioned a predetermined distance from the orifice is a plate member against which the fluid is directed. Means is interconnected between a movable member, the position of which is to be monitored, and at least one of the nozzle and the plate, thereby to vary the distance between the orifice and the plate in response to movement of the movable member. At least one of said nozzle and said plate is also adapted to move in response to changes in pressure in said nozzle, irrespective of how created, to thereby effect pressure feedback to the position monitoring apparatus.

In accordance with a more specific aspect of apparatus having pressure feedback in accordance with the present invention, there is provided a bendable beam member which is anchored either rigidly or through a pivot member or the like at one end thereof, and is affixed at the other end to the member whose position is to be monitored. Positioned adjacent the bendable beam member is a nozzle orifice which is connected to a source of hydraeric fluid under pressure. The bendable beam is, in the area adjacent the nozzle orifice constructed to be flexible in such a manner that the distance between the beam and the nozzle orifice varies in response to pressure changes at the nozzle orifice irrespective of how such pressure changes are created.

A better and more detailed understanding of the position monitoring apparatus having pressure feedback constructed in accordance with the present invention, will become apparent from a consideration of the drawings to which reference is hereby made, and particularly to FIG. 1 thereof. As is illustrated therein, a member 11 which is movable as is indicated by the double-ended arrow 12, is to have its position monitored at all times by the apparatus constructed in accordance with the present invention. That is, as the apparatus moves from the position as shown in solid lines to an alternate position such, for example, as that shown by the dashed lines 13, its change in position is monitored and an output signal indicative thereof provided.

In order to accomplish the monitoring, a plate member in the form such as that of a bendable beam 14 has one end thereof 15, affixed to or in engagement with the movable member 11 while the other end is affixed to a housing or similar structure to which it may be anchored, as is indicated by the ground symbol 16. A conduit 17 defining passageway means 18 having a restricted or metering orifice 19 therein, is connected to a source 20 of hydraeric fluid under pressure. The conduit 17 also is connected to a nozzle member 21 having a nozzle orifice 22. A chamber is defined between the nozzle orifice 22 and the metering orifice 19, as is illustrated by the designation 23. A conduit means 24 is in communication with the chamber 23, and detects pressure changes present within the chamber 23, thus providing an output pressure signal that can be applied to any utilizing apparatus desired.

The bendable beam member 14 is constructed in such a manner that at least the area thereof immediately adjacent the nozzle orifice 22 is flexible, and moves in response to and proportional to changes in pressure at the nozzle orifice 22. Such pressure changes can occur primarily from two sources; the first of these is pressure changes that may result from changes in pressure of the source 20 of hydraeric fluid under pressure, while the second is a change in pressure which may occur as a result of movement of the movable member 11 causing the beam 14 to follow the same and vary the spacing between the nozzle orifice and the beam.

The desired flexibility of the beam 14 causing it to be responsive to pressure changes at the nozzle orifice 22, can be accomplished by making the entire beam flexible, as is illustrated in FIG. 1 which is the presently preferred embodiment of the present invention. Obviously, alternative structure may be utilized to accomplish the same purpose. One example of such structure is illustrated in FIG. 2 to which reference is hereby made.

As is illustrated in FIG. 2, the beam 27 is relatively heavy and though bendable so as to follow movement of the movable member to which it is attached, is nonetheless not flexible to a degree sufficient to respond to pressure changes at the nozzle orifice. The nozzle 21a is positioned adjacent the beam 27, however, the beam 27 has an opening provided therethrough which defines an interior slotted recess 28 within which there is disposed a flexible member or membrane 29. The flexible member 29 is movably responsive to pressure changes at the nozzle orifice of the nozzle 21a as is indicated by the arrow 30 and thus varies the spacing between it and the nozzle.

Irrespective of the structure adopted, the nozzle orifice is positioned adjacent the plate member such as the bendable beam 14 or 27 such that under quiescent conditions, that is when the movable member 11 is in its null or reference position, there is a predetermined space between the beam 14 and the nozzle orifice 22, referring now again to FIG. 1. Such predetermined space is indicated by the designation $d$. At the time that the space $d$ is in existence between the nozzle orifice and the beam 14 a predetermined reference pressure is in existence within the chamber 23 and appears as an output pressure signal from the position monitoring apparatus. As is described in the above-referred to co-pending patent application, if the member 11 moves to the position indicated by the dashed lines 13, the beam 14 moves closer to the nozzle orifice 22, thus increasing the pressure within the chamber 23 and providing an increased output pressure signal indicative of the movement of the member 11 toward the left as viewed in FIG. 1. A counter movement, that is movement toward the right in FIG. 1, increases the spacing $d$ causing the output pressure signal to decrease, in a proportional amount. If, however, the member 11 were to remain stationary and the pressure in the source 20 of hydraeric fluid increased, the pressure within the chamber 23 also increases. Even though the member 11 remained stationary, such increased pressure appears as an increase in the output pressure signal, thus causing the utilizing apparatus connected to the conduit 24 to react accordingly. A decrease in pressure causes a corresponding output signal, but of opposite direction.

By utilizing a flexible beam as is illustrated in FIG. 1 and FIG. 2 hereof, the creation of such signals in response to input pressure changes is overcome when such is required. For example, in the event that the source of fluid 20 experienced for any reason a pressure increase, thus causing the pressure within the chamber 23 to increase, the beam 14 being flexible, at least in the area adjacent the nozzle orifice 22, responds to the pressure increase and immediately moves to a position such as that shown by the dashed line 25. By having the beam 14 move to the position shown by the dashed line 25, the space between the nozzle orifice 22 and the beam 14 is increased to a spacing such as that shown at $d_1$. This increased spacing immediately returns the pressure within the chamber 23 toward the null or reference pressure thus causing the output signal to remain substantially constant even though the input pressure from the source 20 had increased even by a substantial amount. Conversely, if the pressure at the source 20 decreased causing the pressure within the chamber 23 to decrease accordingly, the beam 14 moves to the position shown by the dotted line 26. Such movement immediately reduces the spacing between the nozzle orifice 22 and the beam 14 to a position such as that shown at $d_2$. This decreased spacing in turn causes the pressure appearing in the chamber 23 to again rise to the reference pressure, and causes the output pressure signal to thereby remain substantially constant. Obviously, the structure illustrated in FIG. 2 with the flexible, membraneous member 29 positioned adjacent the nozzle 21a thereof, operates in substantially the same manner as described above.

By utilizing a structure in which the spacing between the nozzle orifice and the plate member is variable in response to pressure changes occuring at the source of hydraeric fluid to thus compensate for such pressure changes, the position monitoring apparatus having the pressure feedback in accordance with the present invention, becomes substantialy insensitive to input pressure changes as compared to a position monitoring system without such pressure feedback. A comparative analysis between such systems is illustrated in the graph of FIG. 3, to which reference is hereby made.

As is shown in FIG. 3, the input pressure as it would appear in passageway 18 of FIG. 1, is plotted in pounds per square inch along the abscissa, while the output pressure signal such as that which would be seen in chamber 23 or conduit 24, is plotted along the ordinate in pounds per square inch. The variation of output pressure is response to changes in input pressure in a system in which there is no pressure feedback in accordance with the present invention, is illustrated by the curve shown at 31 while such changes in a system such as that shown in FIG. 1 is illustrated by the curve 32. As is shown by the curve 31, if the input pressure is permitted to vary, for example, by an amount of 1,000 p.s.i., that is from 2,000 to 3,000 p.s.i., the output pressure signal in a system having no pressure feedback varies from 1,350 p.s.i. to 2,000 p.s.i., thus there is a change of 650 p.s.i. in the output pressure signal in response to pressure change at the source of 1,000 p.s.i. On the other hand, by utilizing a system having feedback therein in accordance with the present invention as is illustrated by the curve 32, a variation of 1,000 p.s.i. in the input pressure creates a change in output pressure of only 150 p.s.i. As can be seen therefore, a change in the input pressure in a system without feedback of one pound per square inch (p.s.i.) would cause an output pressure signal variation of .65 p.s.i. As is known by those skilled in the art, it is not uncommon for a system utilizing sources of hydraeric fluid under pressure of the magnitude of that being dealt with herein to have variations in input pressure on the order of 1,500 p.s.i. Thus it can be seen that substantial output pressure signal variations would occur in such a system without pressure feedback. On the other hand, with pressure feedback where 1 p.s.i. input pressure variation would cause a variation in output pressure signal of only .15 p.s.i., such variations would have substantially no effect.

It should also be noted that the beam flexes in response to pressure changes within the chamber 23 which are initiated by movement of the movable member 11, as well as those resulting from input pressure changes. That is, when the movable member 11 moves to the position indicated by the dashed line 13 thus causing the beam 14 to move closer to the nozzle orifice 22, the pressure within the chamber 23 increases. The increase in pressure in turn causes the flexible portion of the beam 14 adjacent the orifice 22 to tend to return toward its null position as illustrated, so that the spacing is as shown at $d$, which in turn causes the pressure within the chamber 23 to reduce somewhat. Thus, it can be seen that a negative feedback is provided by utilizing the flexible plate member adjacent the nozzle orifice 22.

By the utilization of the negative pressure feedback as above referred to, the operation of the device is more linear than would otherwise be expected. That is, on those portions of the operating curve of the position monitoring apparatus in accordance with the present invention wherein the changes in output pressure are not linear with a given incremental change in the spacing $d$, the feedback characteristics of the flexible beam tend to cause the flexing portion of the beam to assume that position more nearly approximating the desired position than it would otherwise do. Such movement then causes the output pressure signal to be very nearly linear over the entire operating range of the position monitoring apparatus.

An alternative embodiment of an apparatus having pressure feedback in accordance with the present invention is illustrated in FIG. 4 to which reference is hereby made. As is therein illustrated, a movable member 35, movable in either direction as indicated by the arrow 36, is the member whose position is to be monitored. A plate member such as the bendable beam 37 has one end thereof 38 affixed to the member 35 and the other end is anchored to a housing or other stationary apparatus as is indicated by the ground symbol 39. A housing 41 defines a bore 42 therein which may be ported to return if desired. Slidably disposed within the bore 42 is a nozzle member 43 having an orifice 44 and ports 45 and 46 extending through the walls thereof. A resiliently deformable means such as a spring 47 is positioned within the bore 42 between the end wall thereof and the closed end of the nozzle 43, thus spring loading the nozzle as will become more fully apparent hereinafter. Passageway means 48 is defined by the housing 41 and includes a restricted orifice 49 therein, and is interconnected by means of conduit 50 to the source 51 of hydraeric fluid under pressure, and also to the recess 52 which communicates with the port 46. Housing 41 also defines a passageway 53 which communicates with the recess 54, which in turn communicates with the port 45 and thereby provides an output pressure signal for connection to the passageway 53 and to any desired utilizing apparatus. Under normal operating conditions, the hydraeric fluid under pressure is supplied through the passageway 48, the recess 52 and the port 46, to be expelled through the nozzle orifice 44. Under quiescent operating conditions, that is when the source of fluid has a predetermined nominal pressure and the member 35 is in its null position, the output pressure appearing at the orifice 44 sets up forces against the end wall of the nozzle, causing the nozzle 43 to move toward the left within the bore 42 as viewed in FIG. 4, and against the force of the spring 47 and assumes a position such that a predetermined space $d$ exists between the nozzle orifice and the surface of the bendable beam 37. It should be understood in this embodiment of the present invention that the beam 37, though bendable, is not flexible in the sense as described with reference to FIGS. 1 and 2. The spacing $d$ would then be considered a reference or null spacing.

In the event the pressure at the source 51 were to suddenly increase above the nominal or desired amount, the pressure appearing at the nozzle orifice 44 would increase proportionally. Such increase in pressure sets up forces against the back wall of the nozzle 43, causing the nozzle to move toward the left as viewed in FIG. 4, against the force of the spring 47, thus increasing the spacing to a position for example such as that shown at $d_1$. The increase in spacing in turn reduces the pressure within the nozzle 43 and also returns the output pressure signal to its normal or reference value. Conversely, a decrease in pressure at the source 51 decreases the pressure at the nozzle orifice 44, and the force of the spring 47 urges the nozzle 43 toward the right as viewed in FIG. 4, to a closer spacing such as that shown at $d_2$, thus causing the output pressure signal and the pressure within the nozzle to increase and return toward the normal reference pressure. Thus it is seen that the structure as illustrated in FIG. 4 operates similar to that in FIG. 1 to overcome changes in pressure at the source of the fluid under pressure. The nozzle 43 also varies its position and thus the spacing $d$ in response to movement of the movable member 35. For example, if the movable member 35 moved toward the left as viewed in FIG. 4, the spacing $d$ is decreased thus causing the output pressure signal to increase. The output pressure signal increasing in turn moves the nozzle member 43 toward the left against the tension of spring 47, thus incerasing the spacing $d$ and tending to return it to its normal spacing $d$ in quiescent condition. Thus it is seen that negative feedback exists in the structure of FIG. 4, and operates similarly to the negative feedback of that above described and with the same results.

Referring now more particularly to FIG. 5, there is illustrated in schematic representation a typical installation of a position monitoring apparatus having negative pressure feedback in accordance with a preferred form of the present invention. As is therein shown, a housing 61 defines a bore 62 therein. A spool valve 63 of the form readily recognized by those skilled in the art, is slidably positioned within the bore 62 and is centered by being spring loaded at each end thereof by springs 64 and 65, so as under quiescent conditions to be positioned at its null or quiescent position centrally within the bore 62. The position of the spool valve 63 is controlled by a torque motor and flapper valve 66, the output of which is applied by way of conduits 67 and 68 to the cavities at each end of the spool valve 63 within the bore 62. As the pressure differential across the ends of the spool valve 63 changes, the spool valve 63 changes its position within the bore 62 thus causing hydraeric pressure under fluid to be applied to a hydraeric actuator (not shown) for movement thereof. It is the position of the spool valve 63 which it is desired to monitor at all times. For this purpose the housing 61 defines a cavity 69. Positioned within the cavity 69 is a nozzle 71 having a nozzle orifice 72. Positioned adjacent the nozzle orifice 72 is a baffle member ssuch as a bendable flexible beam 73. The beam 73 flexes in response to pressure variations, at least in that portion thereof adjacent the nozzle orifice 72, as is illustrated by the outwardly bent portion 74 of the beam 73. One end of the beam 73 is anchored to a plate member 75 as by brazing thereto, or the like, and the combination of the anchor member 75 and the beam 73 is inserted into place within the housing 61 and sealed against the escape of hydraeric fluid under pressure by means of a seal member 76, such as an O-ring. The opposite end 77 of the beam 73 is in engagement with the spool valve 63 and moves in response to the movement thereof. It should be expressly understood that in accordance with the preferred form of the present invention, the end 77 of the beam 73 is uncontained by the spool valve and rides freely against the inner surface 78 of the land on the spool valve 63 as illustrated. There is no direct attachment of the beam end 77 to the spool valve 63, nor does the end 77 engage more than the surface 78 of the spool valve 63. The force of the fluid under pressure against the beam 73 causes the end 77 to at all times remain in contact with the surface 78 of the spool valve 63.

A passageway 81 having a restriction orifice 82 therein is connected to a source of fluid under pressure, while an additional passageway 83 is interconnected between the chamber 84 and utilizing apparatus (not shown) for purposes of applying the output pressure signal thereto. An additional passageway 85 communicates between the cavity 69 and the return for the source of hydraeric fluid under pressure.

In operation, movements of the spool valve 63 in response to pressure changes initiated by the torque motor are transmitted by way of the beam 73 into pressure changes in the chamber 84 which are coupled externally of the housing 61 by the passageway 83. Negative feedback is effective as above described, to cause the spacing between the nozzle orifice 72 and the center portion 74 of the beam 73 to change responsive to pressure changes at the nozzle orifice 72, set up by movement of the spool valve 63. Also, the spacing is variable in response to changes of the input pressure from the source thereof, as above described.

The apparatus as illustrated in FIG. 5 is extremely linear in operation and is quite insensitive to changes in input pressure. The changes in output pressure with respect to input pressure are quite similar to those shown in FIG. 3 and above described. The linearity of a position monitoring device such as that shown in FIG. 5 is illustrated in FIG. 6 to which reference is hereby made. As is shown in FIG. 6, the spool stroke, that is movement of the valve spool 63 within the bore 62, is plotted along the abscissa in thousandths of inches, while the output pressure, that is the pressure in chamber 84 in conduit 83 of FIG. 5, is plotted along the ordinate in pounds per square inch. As can be seen for each increment of movement of the spool over a rather wide range of movement thereof, that is plus or minus eighteen thousandths of an inch, the output pressure varies equally for each increment in change of spool position. As can be seen from the curve, the variation of output pressure in response to changes in spool position is a straight line, that is, extremely linear.

Under some operating conditions it becomes extremely desirable to have a system which is extremely sensitive to small amplitude changes in position of the apparatus to be monitored such as the spool valve 63 in FIG. 5. Under these conditions friction within the apparatus can sometimes preclude sensing extremely small amplitude changes. To overcome this problem the beam such as that shown at 73 in FIG. 5, is contructed so that under normal operating conditions its resonant frequency is such as to set up a high frequency output pressure signal in the conduit or passageway 83, thus placing a "jitter" in the system which causes any frictional components present therein to be automatically overcome. Thus the system is caused to be extremely sensitive to low amplitude changes in pressure in the chamber 84.

Of course, under some circumstances the "jitter" is not desirable, and if such is not desirable while the remaining parameters, such as high flexibility, of the beam 73 are desired, such can be overcome by ventilating the beam 73. Such ventilation is illustrated in FIG. 7 to which reference is hereby made. This ventilation provides a large surface area for viscous damping of the high frequency motion of the beam.

As is shown in FIG. 7, the bendable flexible beam 88 is affixed at one end thereof to an anchor member 89 such, for example, as by being brazed or otherwise adhered to the upper end of the anchor member 89 as shown at 91. The anchor member 89 defines a cavity 92 therein through which the beam 88 extends. At the opposite end of the beam 88 there is provided a ball 93 which rides against the member whose position is to be monitored as above described in connection with FIG. 5. A plurality of openings 94 extend through the beam 88 in the area adjacent which the nozzle orifice is to be positioned. These openings 94 provide the increase in surface area against which the fluid flows to in turn provide the viscous damping desired.

Another alternative embodiment of an apparatus having pressure feedback in accordance with the present invention is schematically illustrated in FIG. 8 to which reference is hereby made. As is therein illustrated a member 101 the position of which is to be monitored has a groove 101a formed therein. A bendable beam 102 is disposed within a cavity or reservoir 103 formed within a housing and has one end 104 thereof disposed in the groove 101a, and is adapted to move as the member 101 moves. The opposite end 105 of the beam 102 is anchored or affixed to a pivot member or point 106. Nozzle means 107 defining a nozzle orifice 108 is positioned adjacent and spaced from the beam 102 by a predetermined distance as above described. A conduit 109 interconnects a source of hydraeric pressure Ps through a restriction orifice to the nozzle means 107. As thus far described the apparatus of FIG. 8 will provide position monitoring of member 101 but would be sensitive to source pressure variations and would have no feedback means.

Therefore, feedback means is provided and includes conduit means 111 which connects one end of a cylinder 112 to the source of pressure upstream of the restriction orifice 110. The opposite end of the cylinder 112 is connected by conduit means 113 to the reservoir 103. Slidably positioned within the cylinder 112 is a piston 114 which is balanced or adjusted to a predetermined null position against the force of the pressure from the hydraeric fluid by a spring 115 when the system is in its quiescent condition. A rigid or stiff beam 116 is affixed to the piston 114 at one end thereof and to the pivot point 106 at the other end thereof. Thus as the piston 114 moves in the cylinder 112 movement is imparted to the stiff beam 116. Since the stiff beam is connected to the bendable beam 102 through the pivot point 106, the bendable beam also moves.

In operation of the apparatus of FIG. 8 if the member 101 moves toward the left as viewed in FIG. 8, the beam 102 moves with it thus causing the space between the beam 102 and the nozzle orifice 108 to decrease. This decrease in the space causes the pressure in the nozzle 107 to increase and be sensed at the output Po. The increase in pressure is also communicated through conduits 109 and 111 to the right side of piston 114 causing it to move toward the left as viewed in FIG. 8. The movement toward the left causes the lower end of the stiff beam 116 to move toward the left and to in turn impart movement through the pivot point 106 to the bendable beam 102 causing it to move toward the right. Such movement of the bendable beam causes the spacing between the beam 102 and the nozzle orifice to increase and thereby to tend to return to its null position. Thus a negative feedback is applied to the system.

In the event of source pressure variation the piston 114 will react to overcome error signals at the output Po which would otherwise be felt. For example, if the source pressure increased, even though the member 101 remained in its null position, an increased pressure would be present in nozzle 107. This increased pressure is applied to the right side of piston 114 causing movement of the beam 102 to the right as described above to increase the spacing. The increase in spacing in turn lowers the pressure in nozzle 107 to return it to its null condition.

There has thus been disclosed several embodiments of a position monitoring hydraeratic apparatus having pressure feedback. It is to be expressly understood however, that although the several embodiments have been disclosed in considerable detail, such detail is not to be considered as a limitation upon the scope of the present invention as defined in the appended claims.

What is claimed is:

1. Hydraeric apparatus comprising main valve means for controlling flow from a source to passage means and including a movable element, pilot valve means responsive to an input signal for controlling the position of said movable element as a function of the input signal, the improvement of monitor apparatus with feedback for said movable element comprising:

means defining an orifice through which hydraeric fluid under pressure flows continuously;
 a baffle member positioned in a predetermined distance from said orifice and in the line of said flow for impeding said flow thereby establishing a predetermined reference pressure in said orifice defining means when said baffle member is at said predetermined distance for any given fluid source pressure, one of said baffle member and said orifice defining means including means responsive to pressure changes in said orifice defining means for varying said predetermined distance, the movement of said means responsive to pressure constituting a negative pressure feedback signal;
 chamber means communicating with said orifice defining means and in which said pressure appears; and
 means coupling one of said orifice defining means and said baffle member to said movable element.

2. Hydraeric apparatus as defined in claim 1 in which said pressure responsive means of said baffle member is that portion thereof adjacent said orifice defining means being sufficiently flexible to flex in response to pressure variation in said orifice defining means.

3. Hydraeric apparatus as defined in claim 2 in which said flexible portion of said baffle member is a thin membraneous member fitted within said baffle member.

4. Hydraeric apparatus as defined in claim 1 in which said pressure responsive means is a movable orifice defining means.

5. Hydraeric apparatus as defined in claim 1 in which said pressure responsive means is said baffle member having a flexible portion extending along a substantial length thereof with that portion adjacent said orifice being sufficiently flexible to flex in response to pressure variations in said orifice defining means.

6. Hydraeric apparatus as defined in claim 1 in which said pressure responsive means is a piston movable in response to pressure changes, said piston being coupled to said baffle member.

7. Hydraeric apparatus comprising main valve means for controlling flow from a source to passage means and including a movable element, pilot valve means responsive to an input signal for controlling the position of said movable element as a function of the input signal, the improvement of monitor apparatus with feedback for said movable element comprising:

a bendable beam anchored at one end and engaging said movable element at the other, whereby said beam bends in response to movement of said element;
 nozzle means positioned a predetermined distance from said beam for directing hydraeric fluid under pressure thereagainst,
 said predetermined distance being determined by the quiescent position of said movable element,
 said predetermined distance being variable by movement of said element and by changes in pressure in said nozzle means; and
 that portion of said beam positioned adjacent said nozzle means being sufficiently flexible to move in response to changes in pressure at said nozzle means to vary said predetermined distance and thereby to provide a negative pressure feedback signal.

8. Hydraeric apparatus comprising main valve means for controlling flow from a source to passage means and including a movable element, pilot valve means responsive to an input signal for controlling the position of said movable element as a function of the input signal, the improvement of monitor apparatus with feedback for said movable element comprising:

beam means engaging said movable element and bendable in response to movement thereof;
 nozzle means disposed adjacent and spaced from said beam means;
 conduit means adapted to connect a source of hydraeric fluid under pressure to said nozzle means thereby to direct said fluid against said beam means;
 said beam means being sufficiently flexible in that area adjacent said nozzle means to move in response to fluid pressure changes in said nozzle means thereby to produce a negative pressure feedback signal; and
 means for detecting pressure changes in said nozzle means coupled thereto.

9. Hydraeric apparatus comprising main valve means for controlling flow from a source to passage means and including a movable element, pilot valve means responsive to an input signal for controlling the position of said movable element as a function of the input signal, the improvement of monitor apparatus with feedback for said movable element comprising:

a housing member defining a cavity therein;

a nozzle having an orifice disposed within said cavity;

first passageway means having a restriction orifice defined by said housing communicating with said nozzle means to direct hydraeric fluid under pressure into said cavity;

a flat elongated beam rigidly anchored at one end thereof to said housing extending into said cavity with a portion intermediate the ends thereof positioned adjacent and spaced from the orifice of said nozzle, the opposite end of said beam being in engagement with said movable element, said beam being flexible and thereby movable in response to pressure changes in said nozzle to vary the spacing between said nozzle orifice and said beam proportional to said pressure changes in said nozzle and thereby provide a negative pressure feedback signal; and second passageway means defined by said housing communicating with said first passageway means upstream of said restriction orifice to detect pressure changes in said nozzle.

10. Hydraeric apparatus as defined in claim 9 in which said beam has a flexibility such that oscillations thereof are maintained during the time that fluid flows through said nozzle orifice.

11. Hydraeric apparatus as defined in claim 9 in which said beam defines a plurality of openings therethrough in that portion thereof positioned adjacent said nozzle orifice.

12. Hydraeric apparatus as defined in claim 9 in which said opposite end of said beam has only one side thereof in unconfined sliding engagement with a surface of said movable element.

References Cited

UNITED STATES PATENTS

| 2,669,247 | 2/1954  | Olah    | 137—84   |
| 3,055,384 | 9/1962  | Puster  | 137—85   |
| 3,223,105 | 12/1965 | Hogel   | 137—85   |
| 3,315,250 | 4/1967  | Higgins | 137—85 X |

FOREIGN PATENTS 128,332  2/1948  Sweden.

ALAN COHAN, Primary Examiner

U.S. Cl. X.R.

137—553, 557, 625.64